(12) United States Patent
Kozel et al.

(10) Patent No.: US 11,139,642 B2
(45) Date of Patent: Oct. 5, 2021

(54) SWITCHGEAR OR CONTROL GEAR

(71) Applicant: ABB Schweiz AG, Baden (CH)

(72) Inventors: Tomas Kozel, Brno (CZ); Radek Javora, Hrusovany u Brna (CZ); Josef Cernohous, Jamne nad Orlici (CZ); Christoph Budde, Heidelberg (DE); Christian Simonidis, Karlsruhe (DE); Silvia Volponi, Milan (IT); Amina Hamidi, Turgi (CH)

(73) Assignee: ABB SCHWEIZ AG, Baden (CH)

( * ) Notice: Subject to any disclaimer, the term of this patent is extended or adjusted under 35 U.S.C. 154(b) by 39 days.

(21) Appl. No.: 16/720,018

(22) Filed: Dec. 19, 2019

(65) Prior Publication Data

US 2020/0203935 A1 Jun. 25, 2020

(30) Foreign Application Priority Data

Dec. 19, 2018 (EP) .................................... 18214235

(51) Int. Cl.
*H02B 11/20* (2006.01)
*H02B 11/02* (2006.01)
*H02B 11/18* (2006.01)

(52) U.S. Cl.
CPC ............. *H02B 11/20* (2013.01); *H02B 11/02* (2013.01); *H02B 11/18* (2013.01)

(58) Field of Classification Search
CPC .......... H02B 11/02; H02B 11/18; H02B 11/20
See application file for complete search history.

(56) References Cited

U.S. PATENT DOCUMENTS

2015/0340174 A1 11/2015 Yoshida et al.
2018/0174785 A1 6/2018 Sauer

FOREIGN PATENT DOCUMENTS

| CN | 2701132 | Y | 5/2005 |
| CN | 102714401 | A | 10/2012 |
| CN | 104868394 | A | 8/2015 |
| CN | 105680358 | A | 6/2016 |
| CN | 106601543 | A | 4/2017 |
| CN | 108292571 | A | 7/2018 |
| EP | 2346126 | A1 | 7/2011 |
| EP | 2466706 | A2 | 6/2012 |
| EP | 3421190 | A1 | 1/2019 |

(Continued)

*Primary Examiner* — Jacob R Crum
(74) *Attorney, Agent, or Firm* — Leydig, Voit & Mayer, Ltd.

(57) ABSTRACT

A switchgear or control gear includes at least one first compartment; a plurality of removable modules; a plurality of main switchgear or control gear components; and a plurality of auxiliary switchgear or control gear components. The plurality of main switchgear or control gear components includes at least one main busbar system, at least one three position linear or rotational movement disconnector, at least one circuit breaker, and at least one cable connection. The plurality of auxiliary switchgear or control gear components includes at least one disconnector drive and at least one circuit breaker drive. The plurality of removable modules are configured to be mounted horizontally within the at least one first compartment at a plurality of horizontal locations. Movement of a removable module from its horizontal location, the movement including a vertical movement, is configured to move the one or more auxiliary components housed in or associated with that module.

22 Claims, 2 Drawing Sheets

(56) References Cited

FOREIGN PATENT DOCUMENTS

| | | |
|---|---|---|
| EP | 3422501 A1 | 1/2019 |
| EP | 3422502 A1 | 1/2019 |
| EP | 3422503 A1 | 1/2019 |

SWITCHGEAR OR CONTROL GEAR

CROSS-REFERENCE TO RELATED APPLICATION

Priority is claimed to European Patent Application No. EP 18 214 235.6, filed on Dec. 19, 2018, the entire disclosure of which is hereby incorporated by reference herein.

FIELD

The present invention relates to a switchgear or control gear for low voltage, medium voltage or high voltage use within a substation.

BACKGROUND

In state-of-art switchgear and control gear (also called controlgear) designs the parts requiring maintenance are positioned so that the human operator can easily access them while standing on the floor in front of the switchgear. These parts are therefore arranged on different levels one above the other to facilitate the human operator accessing them. This requirement drives the design of main active switchgear parts like primary circuits and current breaking devices to be positioned at different levels one above the other.

Robotic systems have been proposed to operate with the substation or switchgear or control gear and perform both monitoring and maintenance tasks. Such robotic systems attempt to mimic how a human operator accesses components, and therefore operate in a sideways direction into the switchgear or control gear, leading to complexity and weight handling constraints for the automation system. There is a need to address this issue.

SUMMARY

A switchgear or control gear includes at least one first compartment; a plurality of removable modules; a plurality of main switchgear or control gear components; and a plurality of auxiliary switchgear or control gear components.

The plurality of main switchgear or control gear components includes at least one main busbar system, at least one three position linear or rotational movement disconnector, at least one circuit breaker, and at least one cable connection. The plurality of auxiliary switchgear or control gear components includes at least one disconnector drive and at least one circuit breaker drive. The plurality of removable modules are configured to be mounted horizontally within the at least one first compartment at a plurality of horizontal locations. The plurality of main switchgear or control gear components are configured to be housed in the at least one first compartment. The plurality of auxiliary switchgear or control gear components are housed in or associated with the plurality of removable modules. Each of the removable modules is configured to be moved vertically from its horizontal location. Movement of a removable module from its horizontal location, the movement including a vertical movement, is configured to move the one or more auxiliary components housed in or associated with that removable module.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
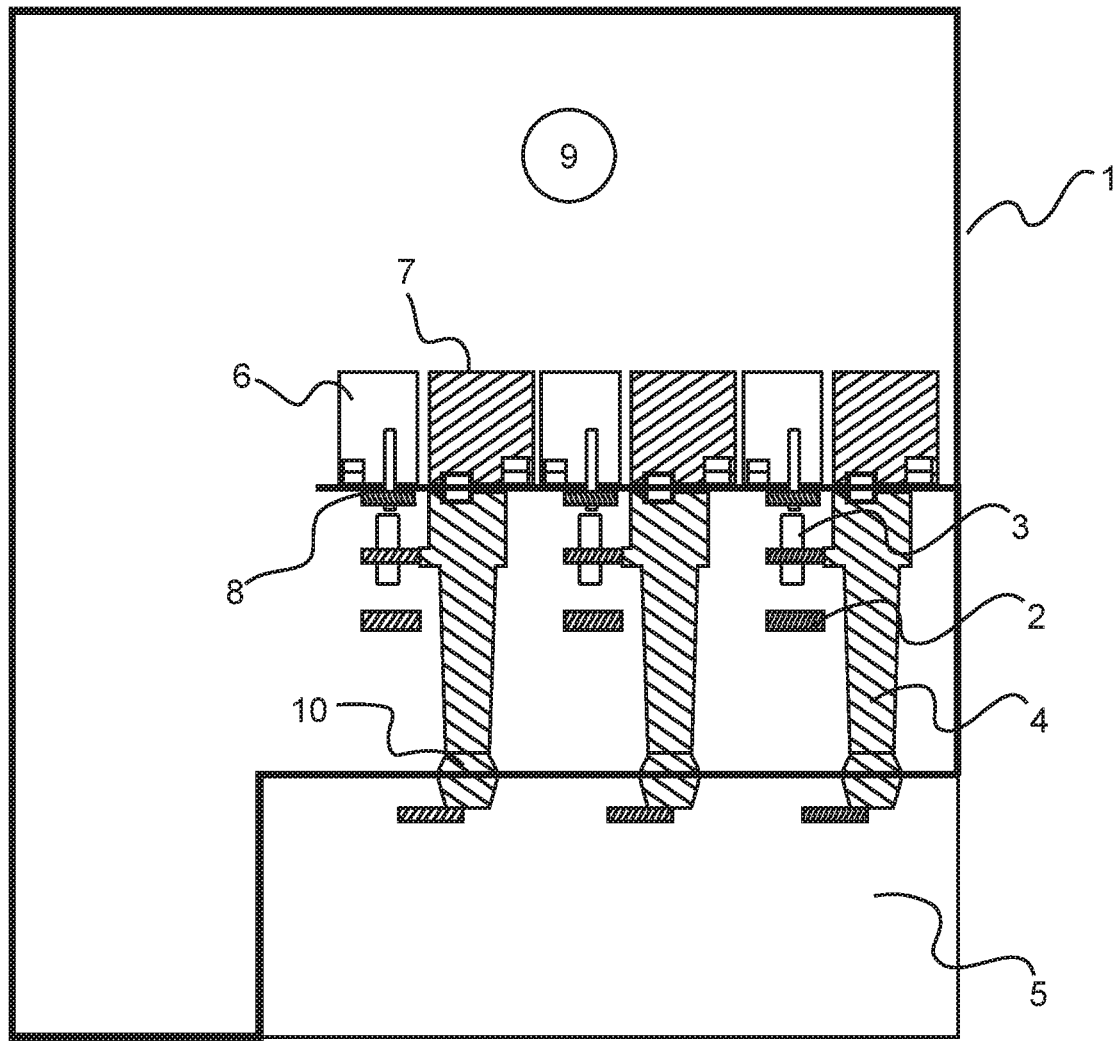
FIG. 1 shows an example of a switchgear or control gear.

Therefore, it would be advantageous to have a better design of a switchgear or control gear.

In an embodiment, there is provided a switchgear or control gear, comprising: at least one first compartment; a plurality of removable modules; a plurality of main switchgear or control gear components; and a plurality of auxiliary switchgear or control gear components.

In an embodiment: The plurality of main switchgear or control gear components comprises at least one main busbar system, at least one three position linear or rotational movement disconnector; at least one circuit breaker, and at least one cable connection. The plurality of auxiliary switchgear or control gear components comprises at least one disconnector drive and at least one circuit breaker drive. The plurality of removable modules are configured to be mounted horizontally within the at least one first compartment at a plurality of horizontal locations. The plurality of main switchgear or control gear components are configured to be housed in the at least one first compartment. The plurality of auxiliary switchgear or control gear components are housed in or associated with the plurality of removable modules. Each of the removable modules is configured to be moved vertically from its horizontal location. Movement of a removable module from its horizontal location, the movement comprising a vertical movement, is configured to move the one or more auxiliary components housed in or associated with that removable module.

Thus, an automatic maintenance system can be operating within the at least one first compartment and where a removable module is moved from its operational location in the switchgear or control gear to a location where the components housed within it or associated with it can then be repaired or maintained. The automatic maintenance system can then reinsert the removable module back in its correct location to reinsert the components back to their operational locations in the switchgear or control gear, or insert a replacement module into the previous location.

In an example (i.e., embodiment), the switchgear or control gear comprises an automatic maintenance system situated within the at least one first compartment. The automatic maintenance system is configured to move each of the plurality of removable modules.

In an example, each of the removable modules is configured to be removed from the at least one first compartment, and removal of a removable module from the at least one first compartment comprises the movement of the removable module. Wherein the removal of the removable module is configured to remove the one or more auxiliary components housed in or associated with that removable module from the at least one first compartment.

In other words, the removable module and the components housed within it or associated with it are completely removed from the switchgear or control gear, for example by a human operator or by a robotic system, thereby enabling the components to be maintained or repaired as required. The same module can be replaced when repaired or maintained, or a different module with the same component types can be inserted in its place.

In an example, the switchgear or control gear comprises a manually operated lifting system, configured to move and/or remove each of the plurality of removable modules In an example, the plurality of auxiliary switchgear or control gear components are divided into a plurality of logical groups. The components in a logical group are housed in or associated with the same removable module.

In an example, at least one auxiliary is associated with the at least one disconnector drive. One or more disconnector drive of the at least one disconnector drive and one or more associated auxiliary are housed in a first removable module.

In an example, three disconnector drives and three sets of associated auxiliaries are housed in the first removable module.

In other words, the disconnector drive components for all of the three phases are housed in the same removable module.

In an example, three disconnector drives and three sets of associated auxiliaries are housed in three different removable modules, one of which is the first removable module.

In other words, the disconnector drive components for all of the three phases are housed in different removable modules.

In an example, one or more three position linear or rotational movement disconnector of the at least one three position linear or rotational movement disconnector is housed in or associated with the first removable module.

In an example, three position linear or rotational movement disconnectors are housed in or associated with the first removable module.

In other words, the disconnectors for all of the three phases are housed in the same removable module, and the associated drive components for all three phases can also be housed in the same removable module.

In an example, three position linear or rotational movement disconnectors are housed in or associated with the three different removable modules.

In other words, the disconnectors for all of the three phases are housed in different removable modules, and the associated drive components for all three phases can also be housed in the corresponding different removable modules.

In an example, at least one auxiliary is associated with the at least one circuit breaker drive. One or more circuit breaker drive of the at least one circuit breaker drive and one or more associated auxiliary are housed in or associated with a second removable module.

In an example, one circuit breaker drive common for all three phases and one set of associated auxiliaries common for all three phases are housed in or associated with the second removable module.

In other words, the circuit breaker drive components for all of the three phases are housed in the same removable module.

In an example, three circuit breaker drives and three sets of associated auxiliaries are housed in or associated with the second removable module.

In an example, three circuit breaker drives and three sets of associated auxiliaries are housed in or associated with three different removable modules, one of which is the second removable module.

In other words, the circuit breaker drive components for all of the three phases are housed in different removable modules.

In an example, one or more circuit breaker pole of the at least one circuit breaker is housed in or associated with the second removable module.

In an example, three circuit breakers are housed in or associated with the second removable module.

In other words, the circuit breakers for all of the three phases are housed in the same removable module, and the associated drive components for all three phases can also be housed in the same removable module.

In an example, three circuit breakers are housed in or associated with the three different removable modules.

In other words, the circuit breakers for all of the three phases are housed in different removable modules, and the associated drive components for all three phases can also be housed in the corresponding different removable modules.

In an example, the at least one first compartment is arc proof.

In an example, each removable module of the at least one removable module comprises a plug and socket connection to supply and signal collection circuits, configured to enable communication and electrical connection with at least one component external to the removable module.

In an example, a plug and socket connection of the at least one plug and socket connection is configured for electrical connection between a circuit breaker drive of the at least one circuit breaker drive and a circuit breaker pole of the at least one circuit breaker.

In an example, the at least one first compartment comprises a cable connection compartment within which is housed the at least one cable connection. The at least one main busbar system, the at least one three position linear or rotational movement disconnector, and the at least one circuit breaker are not housed in the cable connection compartment.

In an example, at least one bushing forms part of the connection between the at least one cable connection and the at least one circuit breaker, and the at least one bushing comprises current and voltage sensors.

In an example, the cable connection compartment comprises at least one door or removable wall section.

In an example, a segregating wall of the cable connection compartment is an arc proof segregation, enabling access of a user to the cable connection compartment when at least one component external to the cable connection compartment but within the at least one first compartment is operational.

In an example, in addition to the cable connection compartment the at least one first compartment comprises a first compartment and a second compartment. The at least one main busbar system, the at least one three position or rotational movement disconnector, and the at least one circuit breaker are housed in the second compartment.

In an example, the first compartment of the at least one first compartment comprises at least one door or removable wall section.

In an example, at least one segregating wall of the first compartment is an arc proof segregation, enabling access of a user to the first compartment of the at least one first compartment when at least one component external to the first compartment but within the at least one first compartment is operational.

In an example, a removable module within which are housed or associated circuit breaker control electronics and auxiliaries also houses or is associated with at least one part of a circuit breaker drive. An interface to a circuit breaker pole comprises a removable mechanical connection configured to transfer mechanical energy from the circuit breaker drive to a circuit breaker moving contact.

Figure 2:
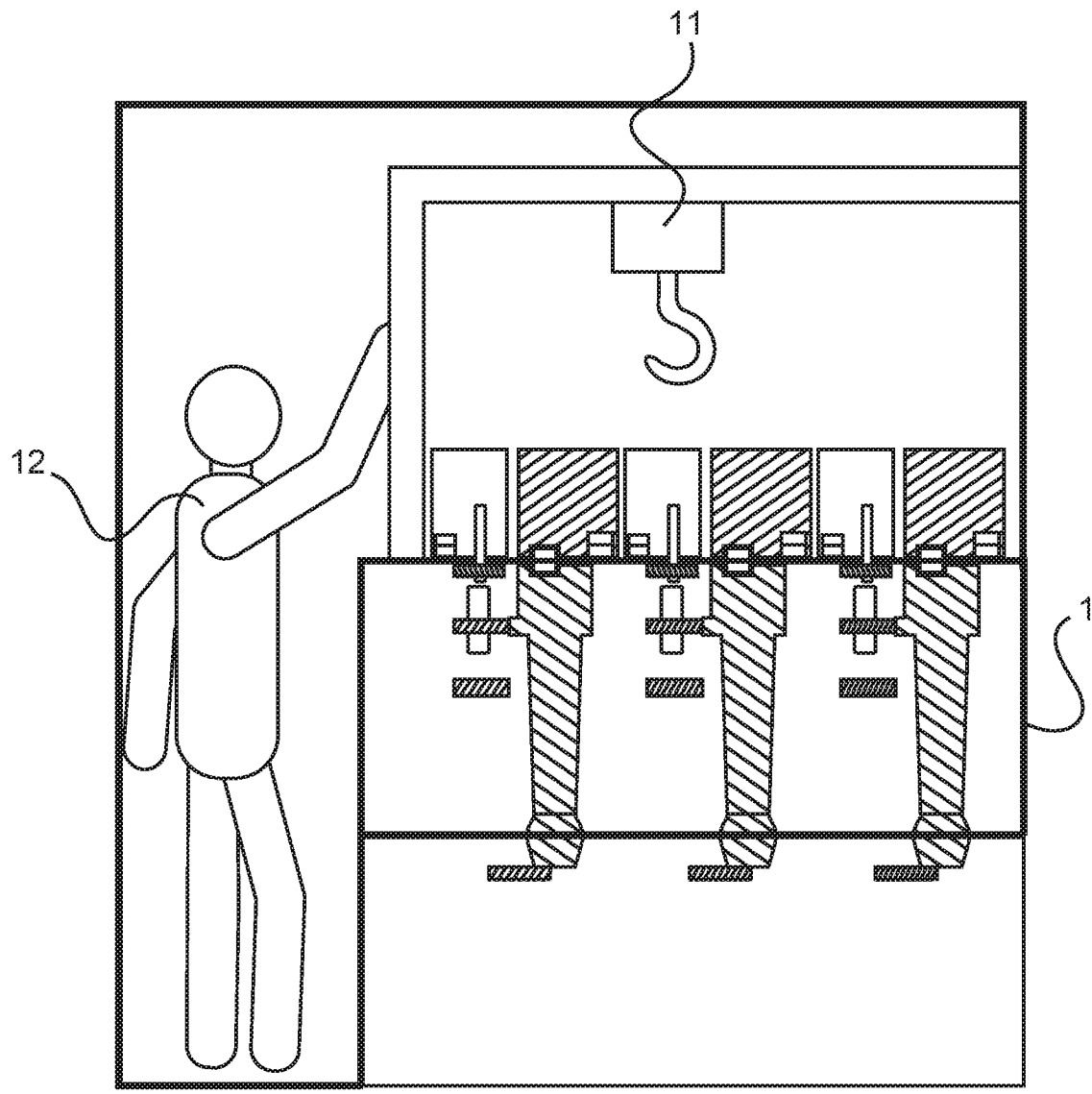
FIG. 2 shows an example of a switchgear or control gear.

FIGS. 1-2 show examples of a switchgear or control gear for operation in a low voltage, medium voltage or high voltage substation.

An example relates to a switchgear or control gear, at least one first compartment 1, 5, 9, a plurality of removable modules 6, 7, a plurality of main switchgear or control gear components, and a plurality of auxiliary switchgear or control gear components. The plurality of main switchgear or control gear components comprises at least one main busbar system 2, at least one three position linear or rotational movement disconnector 3, at least one circuit breaker pole 4, and at least one cable connection. The plurality of auxiliary switchgear or control gear components comprises at least one disconnector drive and at least one circuit breaker drive.

The plurality of removable modules are configured to be mounted horizontally within the at least one first compartment at a plurality of horizontal locations. The plurality of main switchgear or control gear components are configured to be housed in the at least one first compartment. The plurality of auxiliary switchgear or control gear components are housed in or associated with the plurality of removable modules. Each of the removable modules is configured to be moved vertically from its horizontal location. Movement of a removable module from its horizontal location, the movement comprising a vertical movement, is configured to move the one or more auxiliary components housed in or associated with that removable module.

It is to be noted that the term "housed in or associated with", in accordance with an embodiment, means that the component can be completely within the removable module, partially within the removable module or attached in some way to the removable module. What is meant, with respect to the embodiment, is that the component that is housed in or associated with the removable module moves with the removable module when the removable module is moved from its location within the switchgear or control gear. It is also to be noted that reference to circuit breaker can mean the circuit breaker pole.

In an example, the the plurality of removable modules are configured to be mounted horizontally next to each other within the at least one first compartment at a plurality of horizontal locations.

According to an example, the switchgear or control gear comprises an automatic maintenance system situated within the at least one first compartment. The automatic maintenance system is configured to move each of the plurality of removable modules.

According to an example, each of the removable modules is configured to be removed from the at least one first compartment, and removal of a removable module from the at least one first compartment comprises the movement of the removable module. Removal of the removable module is configured to remove the one or more auxiliary components housed in or associated with that removable module from the at least one first compartment.

According to an example, the switchgear or control gear comprises a manually operated lifting system, configured to move and/or remove each of the plurality of removable modules According to an example, the plurality of auxiliary switchgear or control gear components are divided into a plurality of logical groups. The components in a logical group are housed in or associated with the same removable module.

According to an example, at least one auxiliary is associated with the at least one disconnector drive. One or more disconnector drive of the at least one disconnector drive and one or more associated auxiliary are housed in a first removable module.

According to an example, three disconnector drives and three sets of associated auxiliaries are housed in the first removable module.

According to an example, three disconnector drives and three sets of associated auxiliaries are housed in three different removable modules, one of which is the first removable module.

According to an example, one or more three position linear or rotational movement disconnector of the at least one three position linear or rotational movement disconnector is housed in or associated with the first removable module.

According to an example, three position linear or rotational movement disconnectors are housed in or associated with the first removable module.

According to an example, three position linear or rotational movement disconnectors are housed in or associated with the three different removable modules.

According to an example, at least one auxiliary is associated with the at least one circuit breaker drive. One or more circuit breaker drive of the at least one circuit breaker drive and one or more associated auxiliary are housed in or associated with a second removable module.

According to an example, one circuit breaker drive common for all three phases and one set of associated auxiliaries common for all three phases are housed in or associated with the second removable module.

According to an example, three circuit breaker drives and three sets of associated auxiliaries are housed in or associated with the second removable module.

According to an example, three circuit breaker drives and three sets of associated auxiliaries are housed in or associated with three different removable modules, one of which is the second removable module.

According to an example, one or more circuit breaker pole of the at least one circuit breaker is housed in or associated with the second removable module.

According to an example, three circuit breakers are housed in or associated with the second removable module.

According to an example, three circuit breakers are housed in or associated with the three different removable modules.

According to an example, the at least one first compartment is arc proof.

According to an example, each removable module of the at least one removable module comprises a plug and socket connection to supply and signal collection circuits, configured to enable communication and electrical connection with at least one component external to the removable module.

According to an example, a plug and socket connection of the at least one plug and socket connection is configured for electrical connection between a circuit breaker drive of the at least one circuit breaker drive and a circuit breaker of the at least one circuit breaker.

According to an example, the at least one first compartment comprises a cable connection compartment 5 within which is housed the at least one cable connection. The at least one main busbar system, the at least one three position linear or rotational movement disconnector, and the at least one circuit breaker are not housed in the cable connection compartment.

According to an example, at least one bushing 10 forms part of the connection between the at least one cable connection and the at least one circuit breaker. The at least one bushing comprises current and voltage sensors.

According to an example, the cable connection compartment comprises at least one door or removable wall section.

According to an example, a segregating wall of the cable connection compartment is an arc proof segregation, enabling access of a user to the cable connection compartment when at least one component external to the cable connection compartment but within the at least one first compartment is operational.

According to an example, in addition to the cable connection compartment the at least one first compartment comprises a first compartment 9 and a second compartment. The at least one main busbar system, the at least one three position linear or rotational movement disconnector, and the at least one circuit breaker are housed in the second compartment.

According to an example, the first compartment of the at least one first compartment comprises at least one door or removable wall section.

According to an example, at least one segregating wall of the first compartment 9 is an arc proof segregation, enabling access of a user to the first compartment of the at least one first compartment when at least one component external to the first compartment but within the at least one first compartment is operational.

According to an example, a removable module within which is housed or associated circuit breaker control electronics and auxiliaries also houses or is associated with at least one part of a circuit breaker drive. An interface to a circuit breaker pole comprises a removable mechanical connection configured to transfer mechanical energy from the circuit breaker drive to a circuit breaker moving contact.

According to an example, a circuit breaker single pole unit is housed in or associated with the removable module. The circuit breaker single pole unit utilizes a rotational circuit breaker pole. A vacuum interrupter located in a central axis of the pole serves as the main current switching device while rotation of the pole around the central axis is configured to act as a three position disconnector switch for connection, disconnection, and earthing.

Thus, a new substation development is provided, where switchgear or control gear has been designed allowing for a much simpler access to parts requiring maintenance. This has applicability for switchgear and control gear for unmanned operation and maintenance and for human operated switchgears and control gears.

To put this another way, components and devices on the auxiliary circuit are arranged horizontally and in removable modules, facilitating extraction vertically for maintenance by either unmanned or manned systems. Vertical extraction means that the required manipulator used for extraction does not have to be as complex or large as existing manipulators, and helps to limit the requirements for an automation design system.

FIG. 1 shows a detailed example of a switchgear or control gear, where for ease of reference the following features shown are listed:
1. Arc proof enclosure;
2. Main busbar system;
3. Three position disconnector switch;
4. Circuit breaker single pole+electromagnetic EM drive coil;
5. Human operator accessible cable connection box, with removable cover or door, within which copper cable connections are located;
6. Removable box or module with disconnector drive and auxiliaries, and with plug and socket connection to power source and station communication bus;
7. Removable box or module with circuit breaker CB control electronics and auxiliaries, with plug and socket connection to CB drive and auxiliaries and plug and socket connection to power source and station communication bus;
8. Earthing copper;
9. Compartment within which can be located an automatic maintenance system;
10. Bushing providing sealing of cable compartment, including current and voltage sensors.

As shown in the embodiment of FIG. 1, the interface of the switchgear or control gear (also termed controlgear) has been designed for maintenance into one horizontal plane to facilitate automation system handling and handling by human operators.

The switchgear or controlgear has been modularized to allow maintenance activities to be performed via lifting operations, for example for the replacement of components. The parts needing maintenance are grouped to logical sub-assemblies and encapsulated into removable modules. For example, a disconnector switch drive and auxiliaries are enclosed into one module, while circuit breaker (CB) control electronics and auxiliaries are enclosed into another module.

These removable modules are accessible from above on one horizontal plane for the automation system to lift them from their operating position and replace them with spare module. Also, as shown in FIG. 2 this also facilitates access via human controlled manipulation.

The complexity of an automation system is reduced, because a single portal crane with three degrees of freedom can be used first to drive to selected coordinates on the horizontal plane and then performing the lifting operation in the third (vertical) direction.

The automation system weight handling requirements are also reduced, because the load center of gravity is always below the manipulator, thereby avoiding torque.

Rather than using a portal crane, another automation system can utilize a drone, which requires less infrastructure and can perform the lifting operations, especially if the loads and weights of the replaceable modules are limited.

In FIG. 1 the replaceable modules are shown as separate boxes/modules, each one containing auxiliaries of one switching device. However, the boxes/modules can be merged to form one bigger box/module for all three phases or one bigger box/module for both circuit breaker and disconnector. The primary parts of these devices, if designed withdrawable, can be attached to the box/module as well to form one bigger and heavier removable module.

The design of the switchgear or control gear of FIG. 1 is shown with phases separated and single pole circuit breaker units. Rearrangement of state-of-art switchgear and controlgear design, with three phase switching devices is also possible.

The disconnector switch in FIG. 1 is shown as a linear movement type, but this also can be a disconnector switch with rotational movement.

The removable module of the circuit breaker shown in FIG. 1 includes the control electronics and auxiliaries and allows a simple electrical plug and socket connection to the circuit breaker drive. The module can also include parts of the CB drive, and then the interface to the CB pole can be a removable mechanical connection transferring mechanical energy from the drive to the CB moving contact. Thus, the removable module can comprise the complete circuit breaker single pole unit (the pole including drive and auxiliaries). For that purpose it is possible to use a rotational circuit breaker pole. The vacuum interrupter located in the central axis of the pole is then used for current interruption, while rotation of the pole around the central axis serves for connection, disconnection and earthing as a three position disconnector switch.

FIG. 2 shows a detailed example of a switchgear or control gear designed specifically for human operation, where for ease of reference the following features shown are listed:

1. Arc proof enclosure;
11. Manually operated lifting system;
12. Human operator.

As shown in FIG. 2, to facilitate human operation the switchgear or control gear has been equipped with a manually operated lifting system.

The primary circuit can include other components and devices not described in FIG. 1, such as earthing switch, voltage indication, surge arrestors, Ultra Fast Earthing Switch (UFES), IS-limiters (as invented by ABB Calor Emag in 1955), contactors, load-break switches, fuses.

In an example, a circuit breaker single pole unit is housed in or associated with the removable module, and the circuit breaker single pole unit utilizes a rotational circuit breaker pole. A vacuum interrupter located in a central axis of the pole serves as the main current switching device while rotation of the pole around the central axis is configured to act as a three position disconnector switch for connection, disconnection, and earthing.

In an embodiment (i.e., example), the present invention provides a switchgear or control gear, comprising at least one first compartment (1, 5, 9), at plurality of removable modules (6, 7), a plurality of main switchgear or control gear components, and a plurality of auxiliary switchgear or control gear components. The plurality of main switchgear or control gear components comprises at least one main busbar system (2), at least one three position linear or rotational movement disconnector (3), at least one circuit breaker (4), and at least one cable connection. The plurality of auxiliary switchgear or control gear components comprises at least one disconnector drive and at least one circuit breaker drive. The plurality of removable modules are configured to be mounted horizontally within the at least one first compartment at a plurality of horizontal locations. The plurality of main switchgear or control gear components are configured to be housed in the at least one first compartment. The plurality of auxiliary switchgear or control gear components are housed in or associated with the plurality of removable modules. Each of the removable modules is configured to be moved vertically from its horizontal location. Movement of a removable module from its horizontal location, the movement comprising a vertical movement, is configured to move the one or more auxiliary components housed in or associated with that removable module.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A switchgear or control gear, comprising:
   at least one first compartment;
   a plurality of removable modules;
   a plurality of main switchgear or control gear components; and
   a plurality of auxiliary switchgear or control gear components;
   wherein the plurality of main switchgear or control gear components comprises at least one main busbar system, at least one three position linear or rotational movement disconnector; at least one circuit breaker, and at least one cable connection;
   wherein, the plurality of auxiliary switchgear or control gear components comprises at least one disconnector drive and at least one circuit breaker drive;
   wherein, the plurality of removable modules are configured to be mounted horizontally within the at least one first compartment at a plurality of horizontal locations;
   wherein, the plurality of main switchgear or control gear components are configured to be housed in the at least one first compartment;
   wherein, the plurality of auxiliary switchgear or control gear components are housed in or associated with the plurality of removable modules;
   wherein, each of the removable modules is configured to be moved vertically from its horizontal location; and
   wherein, movement of a removable module from its horizontal location, the movement comprising a vertical movement, is configured to move the one or more auxiliary components housed in or associated with that removable module.

2. The switchgear or control gear according to claim 1, wherein the switchgear or control gear comprises an automatic maintenance system situated within the at least one first compartment, and wherein the automatic maintenance system is configured to move each of the plurality of removable modules.

3. The switchgear or control gear according to claim 1, wherein each of the removable modules is configured to be removed from the at least one first compartment, and wherein removal of a removable module from the at least one first compartment comprises the movement of the removable module, and wherein the removal of the removable module is configured to remove the one or more auxiliary components housed in or associated with that removable module from the at least one first compartment.

4. The switchgear or control gear according to claim 3, wherein the switchgear or control gear comprises a manually operated lifting system, configured to move and/or remove each of the plurality of removable modules.

5. The switchgear or control gear according to claim 1, wherein the plurality of auxiliary switchgear or control gear components are divided into a plurality of logical groups, and wherein the components in a logical group are housed in or associated with the same removable module.

6. The switchgear or control gear according to claim 5, wherein at least one auxiliary is associated with the at least one disconnector drive, and wherein one or more disconnector drive of the at least one disconnector drive and one or more associated auxiliary are housed in a first removable module.

7. The switchgear or control gear according to claim 6, wherein three disconnector drives and three sets of associated auxiliaries are housed in the first removable module.

8. The switchgear or control gear according to claim 6, wherein three disconnector drives and three sets of associated auxiliaries are housed in three different removable modules, one of which is the first removable module.

9. The switchgear or control gear according to claim 6, wherein one or more three position linear or rotational movement disconnector of the at least one three position linear or rotational movement disconnector is housed in or associated with the first removable module.

10. The switchgear or control gear according to claim 9, wherein 3 three position linear or rotational movement disconnectors are housed in or associated with the first removable module.

11. The switchgear or control gear according to claim 9, wherein 3 three position linear or rotational movement disconnectors are housed in or associated with the three different removable modules.

12. The switchgear or control gear according to claim 5, wherein at least one auxiliary is associated with the at least one circuit breaker drive, and wherein one or more circuit breaker drive of the at least one circuit breaker drive and one or more associated auxiliary are housed in or associated with a second removable module.

13. The switchgear or control gear according to claim 12, wherein one circuit breaker drive common for all three phases and one set of associated auxiliaries common for all three phases are housed in or associated with the second removable module.

14. The switchgear or control gear according to claim 12, wherein three circuit breaker drives and three sets of associated auxiliaries are housed in or associated with the second removable module.

15. The switchgear or control gear according to claim 12, wherein three circuit breaker drives and three sets of associated auxiliaries are housed in or associated with three different removable modules, one of which is the second removable module.

16. The switchgear or control gear according to claim 12, wherein one or more circuit breaker of the at least one circuit breaker is housed in or associated with the second removable module.

17. The switchgear or control gear according to claim 16, wherein three circuit breakers are housed in or associated with the second removable module.

18. The switchgear or control gear according to claim 16, wherein three circuit breakers are housed in or associated with the three different removable modules.

19. The switchgear or control gear according to claim 1, wherein the at least one first compartment is arc proof.

20. The switchgear or control gear according to claim 1, wherein the at least one first compartment comprises a cable connection compartment within which is housed the at least one cable connection; and wherein the at least one main busbar system, the at least one three position linear or rotational movement disconnector, and the at least one circuit breaker are not housed in the cable connection compartment.

21. The switchgear or control gear according to claim 20, wherein at least one bushing forms part of the connection between the at least one cable connection and the at least one circuit breaker, and wherein the at least one bushing comprises current and voltage sensors.

22. The switchgear or control gear according to claim 20, wherein in addition to the cable connection compartment the at least one first compartment comprises a first compartment and a second compartment; and wherein the at least one main busbar system, the at least one three position or rotational movement disconnector, and the at least one circuit breaker are housed in the second compartment.

* * * * *